US012003077B2

(12) United States Patent
Michels et al.

(10) Patent No.: US 12,003,077 B2
(45) Date of Patent: Jun. 4, 2024

(54) METHOD FOR INSTALLING SPARK PLUGS ON A CYLINDER HEAD OF AN INTERNAL COMBUSTION ENGINE, AND INTERNAL COMBUSTION ENGINE

(71) Applicant: Volkswagen Aktiengesellschaft, Wolfsburg (DE)

(72) Inventors: Karsten Michels, Magdeburg (DE); Reinhard Strich, Meine (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/238,576

(22) Filed: Aug. 28, 2023

(65) Prior Publication Data

US 2024/0072519 A1 Feb. 29, 2024

(30) Foreign Application Priority Data

Aug. 29, 2022 (DE) ..................... 10 2022 121 764.7

(51) Int. Cl.
*H01T 13/08* (2006.01)
*F02F 1/24* (2006.01)

(52) U.S. Cl.
CPC .............. *H01T 13/08* (2013.01); *F02F 1/242* (2013.01)

(58) Field of Classification Search
CPC ......... H01T 13/08; H01T 13/00; H01T 13/02; F02F 1/242
See application file for complete search history.

(56) References Cited

U.S. PATENT DOCUMENTS 4,059,079 A * 11/1977 Kasima .................. F02B 19/12 123/260
6,489,709 B1 * 12/2002 Teramura ................ H01T 13/08 313/142
8,067,882 B2 11/2011 Fukuzawa et al.
11,552,456 B1 * 1/2023 Lykowski .............. H01T 13/06

FOREIGN PATENT DOCUMENTS

| | | | |
|---|---|---|---|
| DE | 10016558 | A1 | 10/2001 |
| DE | 10338743 | A1 | 3/2005 |
| DE | 102012207319 | A1 | 11/2013 |
| DE | 102019002476 | A1 | 10/2020 |
| DE | 102021102967 | A1 | 8/2022 |
| EP | 2048755 | B1 | 4/2013 |

* cited by examiner

*Primary Examiner* — Jacob M Amick
(74) *Attorney, Agent, or Firm* — Muncy, Geissler, Olds & Lowe, P.C.

(57) ABSTRACT

A method for installing spark plugs on a cylinder head of an internal combustion engine. An oriented thread is incorporated in the spark plug and a corresponding internal thread is incorporated in a hole for receiving a spark plug in the cylinder head of the internal combustion engine. A sealing element is arranged between a contact surface on the cylinder head and a shoulder on the spark plug. The spark plug is inserted in the hole in the cylinder head and the thread of the spark plug is screwed into the internal thread of the hole. A fine alignment of the spark plug is performed in terms of a position with respect to angle of rotation relative to the combustion chamber, wherein the sealing element is pressed together during the fine alignment until a final angular position of the spark plug is reached.

9 Claims, 4 Drawing Sheets

METHOD FOR INSTALLING SPARK PLUGS ON A CYLINDER HEAD OF AN INTERNAL COMBUSTION ENGINE, AND INTERNAL COMBUSTION ENGINE

This nonprovisional application claims priority under 35 U.S.C. § 119(a) to German Patent Application No. 10 2022 121 764.7, which was filed in Germany on Aug. 29, 2022, and which is herein incorporated by reference.

BACKGROUND OF THE INVENTION

Field of the Invention

The present invention relates to a method for installing spark plugs on a cylinder head of an internal combustion engine as well as to an internal combustion engine according to the preambles of the independent claims.

Description of the Background Art

In spark-ignition gasoline engines, especially in gasoline engines with gasoline direct injection into the combustion chambers of the internal combustion engine, the orientation of the spark plug can have an effect on the combustion characteristics of the fuel injected into the combustion chamber. In order to realize operation of a spark-ignition gasoline engine that is especially efficient, and thus optimized in terms of fuel consumption and emissions, it is helpful in the case of a combustion chamber with a prechamber spark plug to align this prechamber spark plug relative to the combustion chamber such that it is rotationally oriented. In the process, the prechamber spark plug is secured in a rotational or angular position relative to the combustion chamber by means of a fastening device or holding device of the internal combustion engine. The rotational orientation of the prechamber spark plug can be achieved by means of a thread with an oriented implementation on the housing of the spark plug in conjunction with a thread with an oriented implementation in the cylinder head. In this way, it is possible to ensure that varying rotational positions of the prechamber spark plug relative to the combustion chamber are avoided during the particular installation of the prechamber spark plug so that the prechamber spark plug and, in particular, its openings in the prechamber, are always aligned in an identical, defined manner relative to the combustion chamber.

From DE 10 2019 002 476 A1, an internal combustion engine for a motor vehicle is known with at least one combustion chamber and with a prechamber spark plug associated with the combustion chamber. In this design, the prechamber spark plug has multiple asymmetrically distributed openings and a prechamber that is fluidically connected to the combustion chamber by the openings. The prechamber spark plug is arranged such that it is rotationally oriented relative to the combustion chamber by means of a thread with an oriented implementation on the prechamber spark plug and an appropriate, correspondingly aligned thread on the cylinder head of the internal combustion engine.

DE 10 2012 207 319 A1 describes a method for producing a spark plug that includes the following steps in the specified sequence: providing a spark plug housing having a cylindrical section, placing a sealing element on the cylindrical section, and making a thread on the cylindrical section by a forming process, wherein an internal diameter of the sealing element is smaller than a nominal diameter of the thread.

Furthermore, a sealing member for a cylindrical spark plug is known from EP 2 048 755 B1, which corresponds to US 2009/0102346, that includes a metal housing with a thread cut thereon in order to be screwed into a mounting hole of an internal combustion engine. In this design, the sealing member includes an annular sheet-metal element made of austenitic stainless steel or of ferritic stainless steel that is folded back in a radial direction in order to form a region where at least two or more layers of the sheet-metal material overlap in an axial direction. The sealing member is dimensioned to be arranged around an outer circumference of the metal housing of the cylindrical spark plug. The sealing element is designed to be compressed between a circumference of the metal housing and an opening circumferential edge region of a mounting hole of an internal combustion engine, by which means a seal is provided between the projecting region and the opening circumferential edge region when the metal housing is screwed into the mounting hole of the internal combustion engine.

It is a disadvantage of the known solutions, however, that the positioning of the spark plug relative to the combustion chamber is possible only with a relatively large tolerance.

SUMMARY OF THE INVENTION

It is therefore an object of the present invention to permit an exact positioning of a spark plug, in particular a prechamber spark plug, with respect to angle of rotation relative to a combustion chamber of an internal combustion engine, and to overcome the disadvantages known from the prior art.

The object is attained in an exemplary embodiment by a method for installing spark plugs on a cylinder head of an internal combustion engine that includes the following: incorporating an oriented thread in the spark plug and a corresponding internal thread in a hole for receiving a spark plug in the cylinder head of the internal combustion engine; arranging a sealing element between a contact surface on the cylinder head and a shoulder on the spark plug; inserting the spark plug in the hole in the cylinder head and screwing the thread of the spark plug into the internal thread of the hole; and finely aligning the spark plug in terms of a position with respect to angle of rotation relative to the combustion chamber, wherein the sealing element is pressed together during the fine alignment until a final angular position of the spark plug is reached.

An oriented thread should be understood in this context as a thread pair in which a threaded pairing is formed that defines a coarse angular position for the installation of the spark plugs. As a result, a position alignment is achieved that permits a relative angular position of approximately +/−60° angle of rotation between the spark plug and the combustion chamber. Owing to the pressing together of the sealing element, a fine adjustment of the angular position can be accomplished in the range of a few degrees, so that all spark plugs of an internal combustion engine are installed in the same alignment in the different combustion chambers. In particular, the same, defined final position can be achieved for every spark plug so that the flow onto the ignition electrode and/or a prechamber of the spark plug can be reproduced uniformly and within small tolerances.

Provision is made that an orientation mark can be provided on the spark plug, and the final angular position is adjusted on the basis of the position of the orientation mark. A defined alignment of the spark plug in terms of its position with respect to angle of rotation is possible in a simple manner by means of an orientation mark. In this case, a visual or haptic check as to whether the desired final position of the installation location has been reached can be accomplished through the orientation mark.

It is especially preferred in this case when a second orientation mark is formed on the cylinder head, wherein the final angular position of the spark plug is reached when the first orientation mark and the second orientation mark are brought into superposition. The method can be improved further by a second orientation mark on the cylinder head. Consequently, the process can be optimized further and automated through appropriate measuring instruments and mounting devices.

A recess or a projection can be formed on a wrench flat of the spark plug, wherein a tool for installing the spark plug produces a positive-locking connection with this recess or this projection. Partially automated or fully automated process control during installation of the spark plugs in the cylinder head can take place in a simple manner by means of a recess or a projection on the wrench flat of the spark plug. In this case, a positive-locking connection between the tool for installation and the wrench flat of the spark plug makes it possible to ensure that the final position with regard to the angle of rotation is reached with high process reliability.

A check can be made once the final angular position is reached as to whether a predetermined threshold value for a minimum installation torque has been reached, and if it has not been reached, then the spark plug is rotated further by 360°. For significantly more accurate positioning of the spark plug in terms of rotation angle, an additional position improvement is achieved by means of a plastically deformable sealing element that is to be crushed over a wide angular range, in addition to the previously known positioning method by means of the tightening torque and an oriented threaded pairing between the cylinder head and spark plug. In this case, the threads are designed such that their tolerance zone position with respect to the screwing-in of the spark plug when the minimum tightening torque is reached is located even before the desired end position. To permit fine adjustment, the spark plug is then rotated further until the minimum tightening torque is reached and the final position with respect to the angular position is reached. If the minimum tightening torque has not yet been reached, then the spark plug is rotated further by 360° and another measurement is made as to whether both conditions, which is to say the reaching of the minimum tightening torque and the reaching of the final position with respect to the angular position, have been reached.

A fine-pitch thread can be formed on both the spark plug and the cylinder head, and/or the threads have a reduced thread pitch as compared to a standard thread. The crushing per degree of rotation angle can be reduced by a fine-pitch thread or a thread with reduced pitch. In this way, the result can be achieved that the final position with respect to angle of rotation can be reached with high process reliability within the permissible crushing of the sealing element.

A coarse alignment of the rotation angle position of the spark plug when it is being screwed into the cylinder head can be carried out under torque control, and the fine alignment of the spark plug is carried out under control of the angle of rotation. In order to improve the process reliability and accelerate the installation of the spark plugs, it is advantageous when the coarse alignment takes place by means of a comparatively fast, torque-controlled process and the fine alignment takes place by means of a comparatively slow, rotation angle-controlled process.

Another aspect of the invention relates to an internal combustion engine having at least one combustion chamber and one cylinder head with at least one hole for receiving a spark plug, wherein the spark plug is installed in the cylinder head using the exemplary. The conditions in the combustion chamber can be optimized by means of an appropriate alignment of the installation position of the spark plugs with regard to the angular position relative to the combustion chamber, by which means the efficiency of the fuel combustion and/or the untreated emissions in the combustion chambers can be optimized.

The spark plug can be a prechamber spark plug. An alignment of the spark plug with respect to angle of rotation is especially advantageous in the case of a prechamber spark plug in order to permit the same flow conditions for the inflow into the prechamber of the spark plug for all the spark plugs of an internal combustion engine.

The spark plug can be a hook spark plug. With hook spark plugs as well, it can be advantageous to arrange them exactly in a defined angular position relative to the combustion chamber in order to achieve a best possible ignition of a fuel/air mixture and optimal propagation of the flame front through the combustion chamber, especially in the case of a jet-guided combustion procedure with direct injection of fuel into the combustion chamber.

The various embodiments of the invention cited in this application can be combined with one another to good advantage unless otherwise stated in the individual case.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
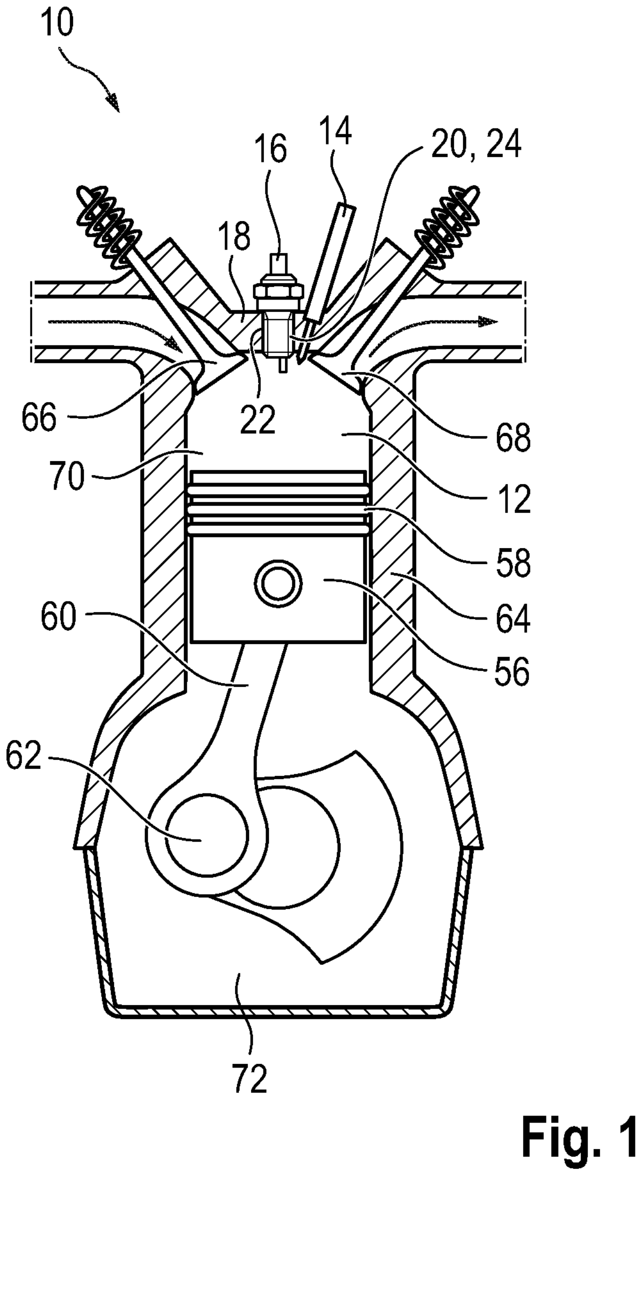
FIG. 1 is a schematic representation of a direct injection gasoline engine.

FIG. 1 shows an internal combustion engine 10 with a combustion chamber 12 in a schematic representation. The combustion chamber 12 is delimited by a cylinder 70 formed in an engine block 64, a piston 56 that is movable in the cylinder 70, as well as a cylinder head 18. At least one intake valve 66 and at least one exhaust valve 68 per combustion chamber 12 are arranged in the cylinder head 18 in order to permit an inflow of fresh air into the combustion chamber 12 and to discharge the exhaust gas correspondingly into an exhaust system of the internal combustion engine 10. Also arranged in the cylinder head 18 are a fuel injector 14 for injecting a fuel into the combustion chamber 12 and a spark plug 16 for igniting a combustible fuel/air mixture in the combustion chamber 12. Provided in the cylinder head 18 for receiving the spark plug 16 is a hole 22 that has an internal thread 24 in order to screw a thread 20 that is formed on the spark plug 16 into the cylinder head 18.

The piston 56 is connected by a connecting rod 60 to a crankshaft 62, wherein an oscillating up-and-down motion of the piston 56 is converted into a rotational motion of the crankshaft 62. The piston 56 is sealed relative to the cylinder 70 by piston rings 58 in order to prevent a flow of combustion gases into the region of the crankshaft 62 as well as an entrainment of oil from an oil sump 72 into the combustion chamber 12.

Figure 2:
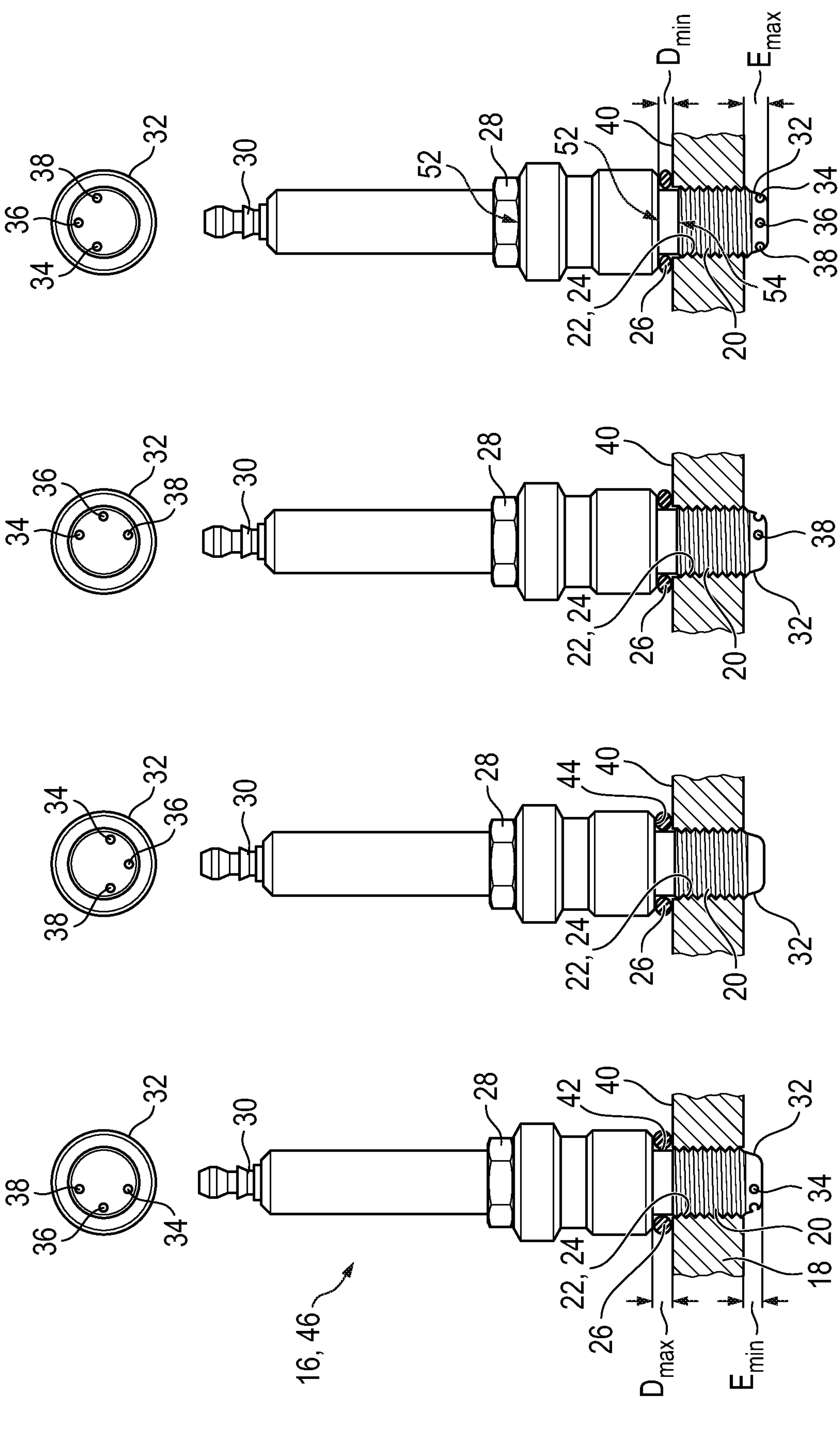
FIG. 2 is an example arrangement of spark plugs, in which the spark plugs are arranged so as to be oriented in terms of rotation angle in the combustion chambers of the internal combustion engine.

In FIG. 2, an example of a cylinder head 18 of an internal combustion engine 10 with spark plugs 16 screwed into the cylinder head 18. The spark plugs 16 in this example are designed as prechamber spark plugs 46 and have a prechamber 32 that extends into the combustion chamber 12 and has three openings 34, 36, 38 for the inflow of a gas into the prechamber 32. Formed on an end section of the spark plug 16 facing the combustion chamber 12 is a thread 20 with which the spark plug 16 is screwed into an internal thread 24 of a hole 22 in the cylinder head 18. Arranged between a contact surface 40 on the cylinder head 18 and a shoulder 44 on the spark plug 16 is a sealing element 26 with which the spark plug 16 is sealed in a gastight manner with respect to the combustion chamber 12. The sealing element 26 has a thickness D in the unloaded, initial state. In order to achieve a gastight seal between the spark plug 16 and the combustion chamber 12, the sealing element 26 must be compressed to at least a thickness $D_{max}$. The sealing element 26 can be pressed together as far as a permissible minimum thickness $D_{min}$. The thread 20 on the spark plug 16 and the internal thread 24 on the hole 22 in the cylinder head 18 are each designed for an oriented installation in order to ensure coarse positioning in terms of rotation angle of the spark plug 16 relative to the cylinder head 18 and thus relative to the combustion chamber 12. An installation position tolerance of approximately +/−60° of rotation angle can be achieved by means of such defined thread implementations at the threads 20, 24.

A wrench flat 28 is formed on the spark plug 16 in order to screw the spark plug 16 into the hole 22 in the cylinder head 18. It is necessary to ensure in this process that the prechamber 32 has a minimum installation depth $E_{min}$ in the combustion chamber 12 in order to be able to ignite a fuel/air mixture there. An orientation mark 52 is provided on the wrench flat 28 in order to align the spark plug 16 in terms of rotation angle position with respect to the position of the openings 34, 36, 38 in the prechamber 32 relative to the combustion chamber 12. The orientation mark 52 can be designed, in particular, as a recess in which a corresponding installation tool engages in order to permit automated installation of the spark plug 16. Furthermore, a second orientation mark 54 can be formed on the cylinder head 18 that is in superposition with the first orientation mark 52 when the spark plug 16 is correctly aligned with regard to the rotation angle position. In this case, a fine alignment of the spark plug 16 is accomplished by a pressing together of the sealing element 26. In this case, the sealing element 26 rests on a seal face 42 on a body of the spark plug 16. For an initial tolerance zone position of +/−60° owing to the oriented threaded pairing of the threads 20, 24, the result is a maximum tolerance band of 120° rotation angle to be compensated, which is covered by a corresponding crushing of the sealing element 26.

Figure 3:
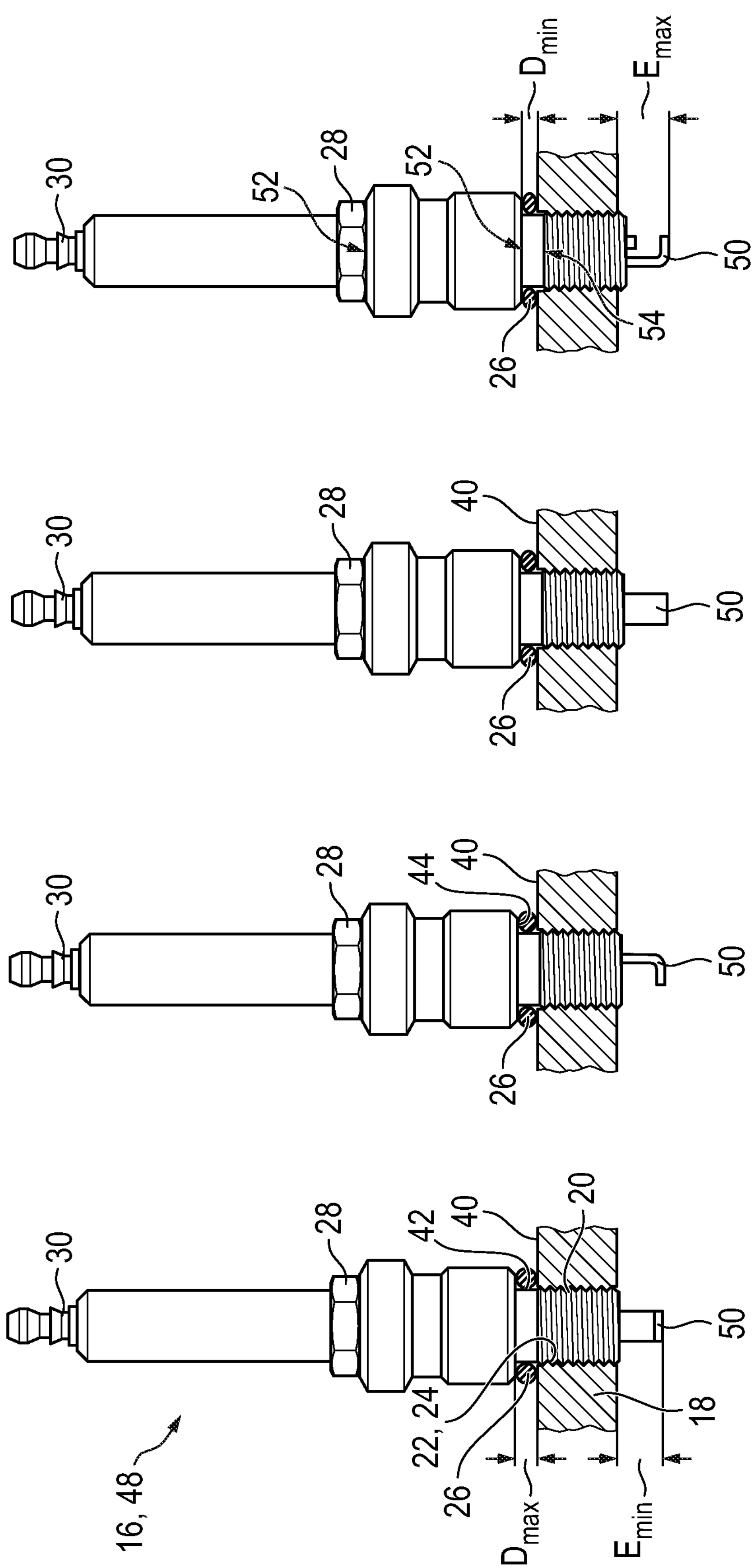
FIG. 3 is an example arrangement of spark plugs, in which the spark plugs are arranged so as to be oriented in terms of rotation angle in the combustion chambers of the internal combustion engine.

In FIG. 3, another example is shown of a cylinder head 18 of an internal combustion engine 10 with spark plugs 16 screwed into the cylinder head 18. The spark plugs 16 in this example are designed as hook spark plugs 48, and have a hook 50 extending into the combustion chamber 12. Formed on an end section of the spark plug 16 facing the combustion chamber 12 is a thread 20 with which the spark plug 16 is screwed into an internal thread 24 of a hole 22 in the cylinder head 18. Arranged between a contact surface 40 on the cylinder head 18 and a shoulder 44 on the spark plug 16 is a sealing element 26 with which the spark plug 16 is sealed in a gastight manner with respect to the combustion chamber 12. The sealing element 26 has a thickness D in the unloaded, initial state. In order to achieve a gastight seal between the spark plug 16 and the combustion chamber 12, the sealing element 26 must be compressed to at least a thickness $D_{max}$. The sealing element 26 can be pressed together as far as a permissible minimum thickness $D_{min}$. The thread 20 on the spark plug 16 and the internal thread 24 on the hole 22 in the cylinder head 18 are each designed for an oriented installation in order to ensure coarse positioning in terms of rotation angle of the spark plug 16 relative to the cylinder head 18 and thus relative to the combustion chamber 12. An installation position tolerance of approximately +/−60° of rotation angle can be achieved by means of such defined thread implementations at the threads 20, 24.

A wrench flat 28 is formed on the spark plug 16 in order to screw the spark plug 16 into the hole 22 in the cylinder head 18. It is necessary to ensure in this process that the prechamber 32 has a minimum installation depth $E_{min}$ in the combustion chamber 12 in order to be able to ignite a fuel/air mixture there. An orientation mark 52 is provided on the wrench flat 28 in order to align the spark plug 16 in a position of the hook 50 in terms of rotation angle with respect to its position relative to the combustion chamber 12. The orientation mark 52 can be designed, in particular, as a recess in which a corresponding installation tool engages in order to permit automated installation of the spark plug 16. Furthermore, a second orientation mark 54 can be formed on the cylinder head 18 that is in superposition with the first orientation mark 52 when the spark plug 16 is correctly aligned with regard to the rotation angle position. In this case, a fine alignment of the spark plug 16 is accomplished by a pressing together of the sealing element 26. In this case, the sealing element 26 rests on a seal face 42 on a body of the spark plug 16. For an initial tolerance zone position of +/−60° owing to the oriented threaded pairing of the threads 20, 24, the result is a maximum tolerance band of 120° rotation angle to be compensated, which is covered by a corresponding crushing of the sealing element 26.

Figure 4:
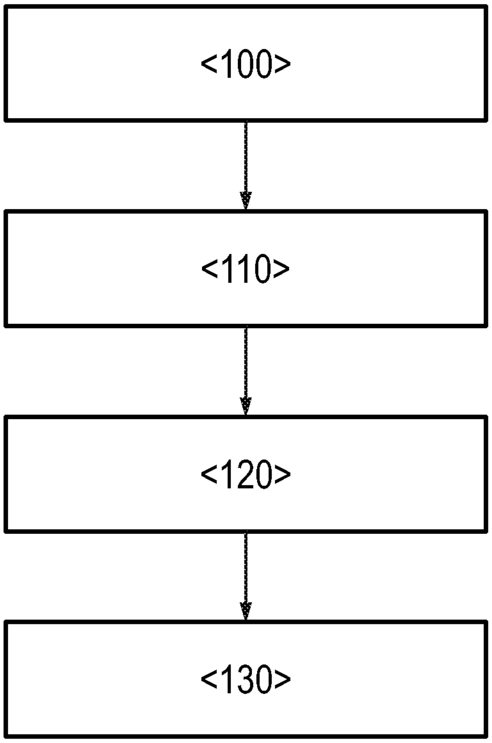
FIG. 4 is a flowchart for a method according to the invention for installing spark plugs on a cylinder head of an internal combustion engine.

In FIG. 4, a flowchart for carrying out a method according to the invention for installing spark plugs 16, 46, 48 on a cylinder head 18 of an internal combustion engine 10 is shown. In a first step <100>, two threads 20, 24 oriented relative to one another are formed on a spark plug 16 and on a hole 22 in the cylinder head 18. In a step <110>, a sealing element 26, in particular a metallic sealing element, is arranged between a contact surface 40 on the cylinder head 18 and a shoulder 44 of the spark plug 16. Preferably the sealing element 26 is designed as a sealing washer having a central opening, which is installed on a seal face 42 of the spark plug 16 over the thread 20. In a step <120>, a coarse alignment of the spark plug 16 relative to the combustion chamber 12 in terms of rotation angle takes place. In this process, a positional tolerance with respect to the rotation angle of approximately +/−60° rotation angle can be achieved through the oriented combination of the threads 20, 24. In a step <130>, a fine adjustment of the position of the spark plug 16 takes place. In this process, the spark plug 16 is rotated until an orientation mark 52 on the spark plug 16 has reached a defined position, wherein the sealing element 26 is compressed and the thickness D of the sealing element 26 is reduced to a value between $D_{max}$ and $D_{min}$. The method permits an alignment of the spark plug 16 relative to the combustion chamber 12 that is accurate to within a few degrees of rotation angle so that flow to all spark plugs 16 of the internal combustion engine 10 takes place with essentially the same flow conditions.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for installing a spark plug on a cylinder head of a combustion chamber of an internal combustion engine, the method comprising:

incorporating an oriented thread on the spark plug and a corresponding internal thread in a hole in the cylinder head of the internal combustion engine for receiving the spark plug;

arranging a sealing element between a contact surface of the cylinder head and a shoulder of the spark plug;

inserting the spark plug in the hole in the cylinder head and screwing the thread of the spark plug into the internal thread of the hole; and finely aligning the spark plug in terms of a position with respect to an angle of rotation relative to the combustion chamber, wherein the sealing element is pressed during the fine alignment until a final angular position of the spark plug is reached, wherein a check is made once the final angular position is reached as to whether a predetermined threshold value for a minimum installation torque has been reached, and if it has not been reached, then the spark plug is rotated further by 360°.

2. The method for installing the spark plug according to claim 1, wherein a first orientation mark is provided on the spark plug, and wherein the final angular position is adjusted on the basis of a position of the orientation mark.

3. The method for installing the spark plug according to claim 2, wherein a second orientation mark is provided, the second orientation mark being formed on the cylinder head, wherein the final angular position of the spark plug is reached when the first orientation mark and the second orientation mark are brought into superposition.

4. The method for installing the spark plug according to claim 1, wherein a recess or a projection is formed on a wrench flat of the spark plug, wherein a tool for installing the spark plug produces a positive-locking connection with the recess or the projection.

5. The method for installing the spark plug according to claim 1, wherein a fine-pitch thread is formed on both the spark plug and the cylinder head, and/or wherein the threads have a reduced thread pitch as compared to a standard thread.

6. A method for installing a spark plug on a cylinder head of a combustion chamber of an internal combustion engine, the method comprising:

incorporating an oriented thread on the spark plug and a corresponding internal thread in a hole in the cylinder head of the internal combustion engine for receiving the spark plug;

arranging a sealing element between a contact surface of the cylinder head and a shoulder of the spark plug;

inserting the spark plug in the hole in the cylinder head and screwing the thread of the spark plug into the internal thread of the hole; and finely aligning the spark plug in terms of a position with respect to an angle of rotation relative to the combustion chamber, wherein the sealing element is pressed during the fine alignment until a final angular position of the spark plug is reached, wherein a coarse alignment of the rotation angle position of the spark plug, when it is being screwed into the cylinder head, is carried out under torque control and the fine alignment of the spark plug is carried out under control of the angle of rotation.

7. An internal combustion engine having at least one combustion chamber and one cylinder head with at least one hole for receiving a spark plug, wherein the spark plug is installed according to the method of claim 1.

8. The internal combustion engine according to claim 7, wherein the spark plug is a prechamber spark plug.

9. The internal combustion engine according to claim 7, wherein the spark plug is a hook spark plug.

* * * * *